Patented Dec. 1, 1953

2,661,066

UNITED STATES PATENT OFFICE 2,661,066

INCREASING PERMEABILITY OF SANDS IN OIL, GAS, AND INJECTION WELLS BY FORMING SOLIDS IN THE STRATA

Donald C. Bond, Northbrook, Ill., assignor to The Pure Oil Company, Chicago, Ill., a corporation of Ohio No Drawing. Application June 26, 1948, Serial No. 35,513

7 Claims. (Cl. 166—21)

This invention relates to a method of improving the efficiency of secondary recovery operations which involve fluid injection into an earth formation to force the flow of oil into a desired formation, and, in particular, the invention relates to a method of modifying water-flooding operations to bring about an increased flow of oil into an earth bore by altering the permeability of strata in the immediate vicinity thereof.

Secondary recovery operations generally follow one of several courses, namely, repressuring the earth formation with gas or water-flooding. Frequently, acidizing is combined with one of the treatments, for it serves to open the pores and the repressuring or water-flooding serves to force the oil into the open formation.

It is a fundamental object of this invention to provide a method of modifying the water-flooding operation which will derive a dual benefit therefrom in that it will increase the permeability of the formation and at the same time flood the formation for the benefits to be derived therefrom.

It is another object of the invention to provide a method of increasing the permeability of water injection wells bored through strata having a permeability so low that water cannot be injected thereinto at a desired rate with a reasonable pressure.

It is another object of the invention to provide a method of increasing the permeability of producing rock formations in an oil well, even though secondary recovery methods are not being used.

It is a further object of the invention to provide a method of increasing the permeability of earth formations.

Other objects and advantages of the invention will in part be obvious and in part appear hereinafter.

The invention, accordingly, comprises a method of increasing the permeability of an earth formation in an oil well or in a water injection well and a modified method of water flooding, which involves the steps and combinations of steps having the relationship each to the other to be hereinafter described, and is principally characterized by the fact that a fluid or fluid mixture having properties which will permit its solidification when exposed to conditions maintained in the well is injected into an oil well at the stratum it is desired to open, caused to solidify in situ sufficiently to create a solid core for an effective distance around the well, the core fluidized and the flooding or production continued with the formation in its thawed and more open state.

I have discovered that the property many materials have, by virtue of which they expand when frozen or solidified, for example, by conversion to their hydrates, can be turned to substantial advantage in oil recovery operations. For example, when water is being used to flood an earth formation, a material improvement can be accomplished by inducing freezing of the water in a stratum it is desired to open, causing the freezing to penetrate a foot or two radially out from the well bore, and then permitting the frozen section to thaw to encourage the flow therethrough. Although water expands only about 10 per cent when it is frozen, such an operation results in a substantial increase in permeability of the formation, which, in some cases, can run as high as about 25 to 35 per cent.

The method of freezing the water at the level where it is desired to accomplish it can be carried out in several ways. Perhaps the most convenient is to flood the formation and then follow it up with liquid propane, or other similarly volatile material and allow it to evaporate in contact with the water at the level where the freezing is to be accomplished. The result is that the refrigeration is applied at substantially the exact point where it is most desirable that the freezing be induced in the formation.

It has been found in practice and experimentally that the force necessary to inject water into an earth formation diminishes inversely as the radial distance from the well bore. Thus, to derive substantial benefit from an increase in permeability, it is necessary only to bring about an increment in the immediate vicinity of the well bore. This, of course, accounts in great measure for the success of acidizing operations where the opening of the formation is accomplished by actual destruction in part thereof. However, compositions of earth strata are such that acidizing is not adaptable universally. It is possible to select the exact stratum which it is desired to open, seal or pack off adjacent strata by techniques described in various discussions of oil well flooding, and force liquid, particularly water, into the stratum it is desired to flood and strip. As was pointed out, since the maximum resistance to the flow into the stratum is encountered in the first foot or two radially out from the well, a great deal of freezing is not necessary to open this portion of the formation. Thus, water can be injected, the stratum flooded and the water frozen in situ, the expansion of which will increase the permeability of the portion of the formation immediately around the earth bore, thereby to permit greater flow of oil into the well.

An experimental demonstration of the effectiveness of freezing as a device for increasing the permeability of earth formations was carried out on a laboratory scale using Berea sandstone cores. The procedure involved testing the core for permeability before and after freezing to determine the net effect of the freezing operation on the permeability.

Experimentally, the procedure was as follows:

A Berea sandstone core 7.2 centimeters in diameter by 2.5 centimeters long, was used for a determination of its permeability to nitrogen. The core was then dried in an oven at 120° C. for three hours, and after cooling, the permeability to nitrogen was again determined. This operation was repeated until values for permeability were reproduced. Following this, a liter of distilled water was passed through the core and it was solidly frozen by packing it in Dry Ice. The frozen core was later placed in an oven, thawed and dried, after which the permeability was again determined. The drying operation was repeated until a constant value for permeability was obtained. The values were determined by passing 0.1 cubic foot of nitrogen through a core at 120 millimeters pressure differential in accordance with the derivation given in Muskat, "Flow of Homogeneous Fluids" (McGraw-Hill, 1937), page 95, in which the formula is $$K = \frac{uQ \, \text{Log}_e \frac{r_e}{r_w}}{2\pi h (P_e - P_w)}$$

Here $u$ is the viscosity of the fluid (nitrogen), $Q$ is the quantity of fluid (milliliters/second), $r_e$ and $r_w$ are the outer and inner radii of the cylindrical core in centimeters, $h$ is the height of the core, and $(P_e - P_w)$ is the pressure differential through the core in atmospheres. $Q$ was calculated for the average pressure $$\frac{(P_e + P_w)}{2}$$

Results are tabulated below.

TABLE

*Effect of freezing on permeability of cores*

| Exp. No. | Original Permeability, Millidarcys A | Permeability After Freezing, Millidarcys B | B/A |
|---|---|---|---|
| 1 | 373 | 269 | 0.72 |
| 2 | 412 | 468 | 1.14 |
| 3 | 308 | 468 | 1.52 |
| 5 | 522 | 512 | 0.98 |
| 6 | 417 | 383 | 0.92 |
| 7 | 430 | 955 | 2.22 |
| 8 | 380 | 468 | 1.23 |
| 9 | 420 | 645 | 1.53 |
| 10 | 380 | 493 | 1.38 |
| Ave. | | | 1.35 |

In translating these experimental results, which show an average increase of about 35 per cent in the permeability of an earth formation, to a field scale, the fact should be taken into account that the idealized conditions in the laboratory would normally be more effective in showing an increase in permeability than field conditions would be. That is to say, it would be unusual consistently to obtain a 35 per cent increase in permeability of earth formations in the field. However, tests conducted in wells where water-flooding operations are being carried out show a substantial increase in the permeability of the formation. When water is injected into a well and while the well is flooded, it is frozen in the bore at the level where the stratum is to be opened and subsequently is allowed to thaw out. It is found that the injectivity of the well bore at that point shows a material increase after the freezing and thawing which compare favorably with increases in permeability determined in the laboratory.

In some unusual earth strata, water alone will alter the permeability in one direction or the other. That is, it is possible that water can increase or decrease the permeability. Particularly can it decrease the permeability if the formation contains materials, such as salt, which will dissolve in water. In order to establish this point, several tests were made in which Berea sandstone cores were treated in exactly the same manner as that described in connection with the examples listed in Table I. However, the freezing step was omitted. In the treatment of the core, therefore, the sample was dried, its permeability determined with nitrogen and then water passed through the core. The water-soaked core was then dried and the permeability was again determined with nitrogen. The results of the test are listed as follows:

| Core No. | Permeability, Millidarcys | | B/A |
|---|---|---|---|
| | (A) Original | (B) After Being Flushed With Water | |
| 1 | 152 | 85 | 0.56 |
| 2 | 322 | 304 | 0.95 |
| Average | | | 0.76 |

It is apparent that flushing of these cores with water tended to reduce the permeability thereof. The explanation can be attributed to some disturbance of the particles forming in the cores and which thereby altered the permeability. However, where a core is of structure such that its permeability tends to be reduced by the circulation of water therethrough, the freezing of that core may produce an even greater increase in permeability than the 35 per cent shown in Table I.

Any liquid which expands upon freezing will be productive of closely similar results when used as described. Mixtures of water with any material with which it forms a solid expanded hydrate are also effective to produce the desired permeability increase when applied to earth strata. Suitable materials for forming hydrates in earth strata include hydrocarbons, particularly the lower boiling paraffinic ones; alkyl chlorides, such as methyl chloride; gases, such as hydrogen sulfide, carbon dioxide, sulfur dioxide, nitrous oxide, chlorine, argon, etc.

The principal virtue of a hydrate forming material resides in the fact that the hydrates form at relatively high temperatures and, by proper choice of materials, the method can be employed without the necessity of freezing a liquid in the well bore. For example, certain oil fields recently opened have produced gas containing 30–40 per cent of hydrogen sulfide. In such cases, it is possible to form hydrogen sulfide hydrate in a well at a desired stratum with little or no refrigeration because the hydrate forms at temperatures up to about 86° F. It is simply necessary to maintain hydrogen sulfide and water in about the stoichiometric ratio, 1 mole to 6, at the level and in the stratum where the increase in permeability is needed. Following formation of the hydrate and the accomplishment of the desired expansion, mild heating will decompose it and release the stratum for further operations.

It will be seen from this description, experimental results and field operations outlined, that I have devised a novel method of conducting water flooding operations which will produce an increase in the permeability of an earth bore and, have also devised a means for increasing the permeability of an earth bore to the flow of oil. Though the invention has been described with only a relatively limited number of tests, the principle is clear and the examples are to be taken merely as illustrative of the scope of the invention and not restrictive thereof.

What is claimed is:

1. A method of increasing the permeability of a consolidated oil-bearing geological stratum to facilitate the flow of oil therethrough which comprises forcing into said oil-bearing stratum a fluid substance convertible to a solid of increased volume, withdrawing sufficient heat from said fluid substance to cause solidification of said fluid substance within said stratum whereby the stratum is fractured, thereafter applying heat to said stratum to fluidize the solidified substance and subsequently flushing said fluidized substance from said stratum thereby accomplishing an increase in the permeability of that stratum.

2. In the secondary recovery of petroleum oils from consolidated subterranean geological stratum the method of increasing the permeability of the oil-bearing stratum which comprises forcing water into said stratum, withdrawing sufficient heat from said water to convert said water into ice whereby the stratum is fractured, applying heat to said stratum to melt the ice and subsequently flushing the resulting water from said stratum thereby accomplishing an increase in the permeability of the stratum.

3. A method in accordance with claim 2 in which the water is forced into a well and converted to ice in a stratum by contacting said water with a liquefied gas in direct heat exchange therewith, gasifying said liquefied gas thereby withdrawing sufficient heat from said water to effectuate its conversion into ice.

4. A method for increasing the permeability of a consolidated oil-bearing geological stratum which comprises forcing into said stratum a gaseous material convertible to a solid upon hydration, converting said gaseous material to a solid hydrate within said stratum by subjecting said gaseous material to hydrate-forming conditions of temperature and pressure in the presence of sufficient amounts of water, thereafter applying heat to said stratum to produce a temperature exceeding the hydrate formation temperature which exists under the ambient conditions within said stratum to fluidize said hydrate, flushing said fluidized hydratable material from said stratum thereby accomplishing an increase in the permeability of said stratum.

5. A method in accordance with claim 4 in which the gaseous material is hydrogen sulfide.

6. A method in accordance with claim 4 in which the gaseous material is nitrous oxide.

7. A method in accordance with claim 4 in which the gaseous material is sulfur dioxide.

DONALD C. BOND.

References Cited in the file of this patent

UNITED STATES PATENTS

| Number | Name | Date |
| --- | --- | --- |
| 1,342,781 | Vedder | June 8, 1920 |
| 1,843,002 | Small | Jan. 26, 1932 |
| 1,979,558 | King | Nov. 6, 1934 |
| 2,033,561 | Wells | Mar. 10, 1936 |
| 2,193,219 | Bowie et al. | Mar. 12, 1940 |
| 2,259,428 | Shelley | Oct. 14, 1941 |
| 2,341,500 | Detling | Feb. 8, 1944 |